(12) United States Patent
Kashiwagi

(10) Patent No.: US 6,175,548 B1
(45) Date of Patent: Jan. 16, 2001

(54) OPTICAL RECORDING MEDIUM AND OPTICAL RECORDING AND REPRODUCING APPARATUS

(75) Inventor: Toshiyuki Kashiwagi, Tokyo (JP)

(73) Assignee: Sony Corporation, Tokyo (JP)

(*) Notice: Under 35 U.S.C. 154(b), the term of this patent shall be extended for 0 days.

(21) Appl. No.: 09/334,135

(22) Filed: Jun. 15, 1999

(30) Foreign Application Priority Data

Jun. 29, 1998 (JP) .................................................. 10-182548
Jun. 29, 1998 (JP) .................................................. 10-182549

(51) Int. Cl.$^7$ ...................................................... G11B 7/24
(52) U.S. Cl. ...................................... 369/275.1; 369/275.4
(58) Field of Search .............................. 369/275.4, 275.3, 369/275.1, 13, 112, 109, 110, 116, 288, 59, 48, 54, 44.26; 428/694 ML, 694 EC, 694 MM, 64

(56) References Cited

U.S. PATENT DOCUMENTS 5,432,774 * 7/1995 Fukumoto et al. ................ 369/275.4
5,764,619 * 6/1998 Nishiuchi et al. ................ 369/275.1

* cited by examiner

Primary Examiner—Ali Neyzari
(74) Attorney, Agent, or Firm—Limbach & Limbach L.L.P.

(57) ABSTRACT

An optical recording medium in which a light transmission layer (12) is formed on an information recording surface (11A) having formed an information recording pit, a laser light with a wavelength ($\lambda$) of 380 nm$\leq\lambda\leq$450 nm is irradiated on the optical recording medium from the light transmission layer side through a lens system having a N.A. (numerical aperture) equal to or more than 0.76 to read the information. In the signal information area thereof, a thickness t of light transmission layer is set to be 3 $\mu$m to 182 $\mu$m, and its thickness irregularity $\Delta t$ is set within $\pm 5.26$ $\lambda/\mu$m (N.A.)$^4$. Also, a track pitch (TP) on the information recording surface (11) is set to be 0.27 $\mu$m to 0.404 $\mu$m, the minimum pit length $P_{min}$ of the information recording pit is set to be 0.13 $\mu$m to 0.219 $\mu$m, a recording line density LD is set to be a pit string equal to or less than 0.146 $\mu$m/bit, and a depth D of information recording pit is set to be 31 nm to 75 nm, whereby the optical recording medium is provided as an optical disc having the memorizing capacity equal to or more than 8 GB and a ROM (Read Only Memory) in at least its part.

23 Claims, 4 Drawing Sheets

OPTICAL RECORDING MEDIUM AND OPTICAL RECORDING AND REPRODUCING APPARATUS

BACKGROUND OF THE INVENTION

1. Field of the Invention

The present invention relates to an optical recording medium and an optical recording and reproducing apparatus (the optical recording and reproducing apparatus in the present specification indicates an apparatus for optically performing a reproduction and/or recording for the optical recording medium) and particularly is to realize a large recording capacity using red and blue laser lights.

2. Description of the Related Art

The feature, when a disk shape is employed as the optical recording medium, resides in that a recording and reproducing apparatus speedy in access, small in size and convenient can be arranged. For example, in order to realize a disk which can carry out a recording and reproducing of NTSC in four hours on its one side face and can replace an existing video tape recorder (VTR), a memorizing capacity equal to or more than 8 GB (giga byte) is required.

SUMMARY OF THE INVENTION

An object of the present invention is to provide an optical recording medium whose memorizing capacity can be made equal to or more than 8 GB and whose fundamental structure is an optical disk having a ROM (Read Only Memory) portion at least in its part and an optical recording and reproducing apparatus which optically carries out a reproducing and/or recording for the optical recording medium.

According to an optical recording medium of the present invention, a light transmission layer is formed on an informaiton recording surface on which an information recording pit is formed, and a laser light with a wavelength $\lambda$ of 380 nm $\leq \lambda \leq$ 450 nm is irradiated from the light transmission layer side through a lens system having an N.A. (numerical aperture) of equal to or more than 0.76 to thereby read out the information. The optical recording medium has such an arrangement that the thickness of its light transmission layer is 3 $\mu$m to 182 $\mu$m, a thickness irregularity of the light transmission layer is within $\pm 5.26\, \lambda/(N.A.)^4$, a track pitch is set to be 0.27 $\mu$m to 0.404 $\mu$m, the shortest or minimum pit length of information recording pit is 0.13 $\mu$m to 0.219 $\mu$m, the recording line density is made as a pit string equal to or less than 0.146 $\mu$m/bit, and the depth of recording pit is set to be 31 nm to 75 nm.

The optical recording and reproducing apparatus of the present invention uses the above-mentioned optical recording medium of the invention and irradiates a laser light with the wavelength $\lambda$ of 380 nm $\leq \lambda \leq$ 450 nm on the optical recording medium through an optical system with the N.A. equal to or more than 0.76 from the light transmission layer side to thereby reproduce a recorded information from the information recording surface.

In the optical recording medium of the present invention, a light transmission layer is formed on the information recording surface, the laser light is irradiated from the light transmission layer side, and the information recording surface is arranged such that a first information recording surface and a second information recording surface, each having at least one, are laminated via an intermediate layer serving as the light transmission layer.

The sum of thickness of light transmission layer and intermediate layer interposed between the surfaces to which the laser light is incident from each information recording surface is set to be 3 $\mu$m to 182 $\mu$m. That is, in such a case where only the light transmission layer exists between the surfaces to which the laser light is made incident from the information recording surface, its thickness is made to be 3 $\mu$m to 182 $\mu$m, while in the case where the light transmission layer and the intermediate layer are interposed, the sum of the thickness of them is made to be 3 $\mu$m to 182 $\mu$m. Then, a thickness irregularity from the surface to which the laser light is made incident to each information recording layer is set within $\pm 5.26\, \lambda/(N.A.)^4$.

The track pitch on the first information recording surface is set to be 0.27 $\mu$m to 0.404 $\mu$m, and the track pitch on the second information recording surface is set to be 0.45 $\mu$m to 0.57 $\mu$m.

The laser light with the wavelength $\lambda$ of 380 nm $\leq \lambda \leq$ 450 nm is irradiated on the first information recording surface through the optical system with the N.A. (numerical aperture) of equal to or more than 0.76, and the laser light with the wavelength $\lambda$ of 635 nm $\leq \lambda \leq$ 680 nm is irradiated on the second information recording surface through the optical system with the N.A. of equal to or more than 0.76 to perform at least any of recording or reproduction for them, respectively.

The optical recording and reproducing apparatus according to the present invention uses the optical recording medium having the first information recording surface and the second information recording surface mentioned above, and irradiates the first laser light with the wavelength $\lambda$ of 380 nm $\leq \lambda \leq$ 450 nm and the second laser light with the wavelength $\lambda$ of 635 nm $\leq \lambda \leq$ 680 nm on the first information recording surface and the second information recording surface through the optical system with the N.A. of equal to or more than 0.76, respectively, to thereby carry out at least any of recording or reproduction for them, respectively.

According to the above arrangement, it is possible to realize a large memorizing capacity equal to or more than 8 GB.

DESCRIPTION OF THE PREFERRED EMBODIMENTS

Figure 1:
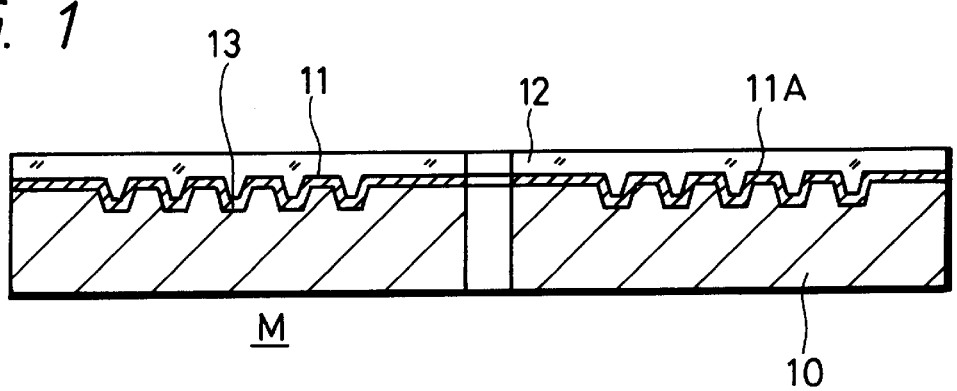
FIG. 1 is a schematic cross-sectional view showing a first example of an optical recording medium according to the present invention.

A first embodiment of an optical recording medium M according to the present invention will be described with reference to FIG. 1 which is a schematic cross-sectional view thereof. As shown in FIG. 1, in this example, on one surface of a substrate 10 such as a plastic substrate, a metal substrate, a glass substrate or the like, formed is an information recording pit 13 to form an information recording surface 11A on which a light transmission layer 12 is formed.

The substrate 10 is formed by the injection-molding, for example, a polycarbonate (PC). At the same time of its molding, fine concave and convex of a predetermined pattern formed on a stamper disposed in a molding metal mold are transferred from the stamper thereto so that the above mentioned information recording pit 13 or a so-called groove is formed on the one surface of the substrate 10.

The thickness of substrate 10 can be selected equal to or more than 0.3 mm which is possible by the injection molding and equal to or less than 1.2 mm corresponding to the thickness of a substrate of a CD or the like.

The thickness t of the light transmission layer 12 is set in a range of 3 $\mu$m to 182 $\mu$m and its thickness irregularity $\Delta t$ is set within $\pm 5.26 \, \lambda/(N.A.)^4$.

A laser light which carried out a reproduction and/or recording is incident from the light transmission layer 12 side.

The laser light is set as a laser light of blue or a laser light with a wavelength range equal to or shorter than blue, namely with the wavelength $\lambda$ of 380 nm$\leq\lambda\leq$450 nm, and is irradiated through a lens system having the N.A. equal to or more than 0.76 to thereby read, for example, information or perform its reproduction.

Also, the track pitch TP on the information recording surface 11A is set to be 0.27 $\mu$m to 0.404 $\mu$m.

The minimum or shortest pit length $P_{min}$ of information recording pit is set to be 0.13 $\mu$m to 0.219 $\mu$m.

The recording line density LD is made as a pit string equal to or less than 0.146 $\mu$m/bit. The depth D of information recording pit is set to be 31 nm to 75 nm.

The thickness t of light transmission layer is set to be preferably 50 $\mu$m to 120 $\mu$m.

Further, it is possible to take such a mode for the optical recording medium M that the laser light with the wavelength $\lambda$ of 635 nm$\leq\lambda\leq$680 nm is irradiated on the optical recording medium M from its light transmission layer 12 side. In this case, the laser light is irradiated through the lens system having the N.A. (numerical aperture) equal to or more than 0.76 to read, for example, information, namely perform the reproduction.

The thickness t of light transmission layer 12 is set to be 3 $\mu$m to 182 $\mu$m and its thickness irregularity $\Delta t$ is set to be within 5.26 $\lambda/(N.A.)^4$.

The track pitch TP of its information recording surface 11A is set to be 0.45 $\mu$m to 0.57 $\mu$m.

The shortest or minimum pit length $P_{min}$ of the information recording pit is set to be 0.21 $\mu$m to 0.31 $\mu$m.

The recording line density LD is set as a pit string equal to or less than 0.21 $\mu$m/bit.

The depth D of the information recording pit is set to be 57 nm to 113 nm.

Also, the thickness t of light transmission layer 12 is set preferably to be 50 $\mu$m to 120 $\mu$m.

Figure 2:
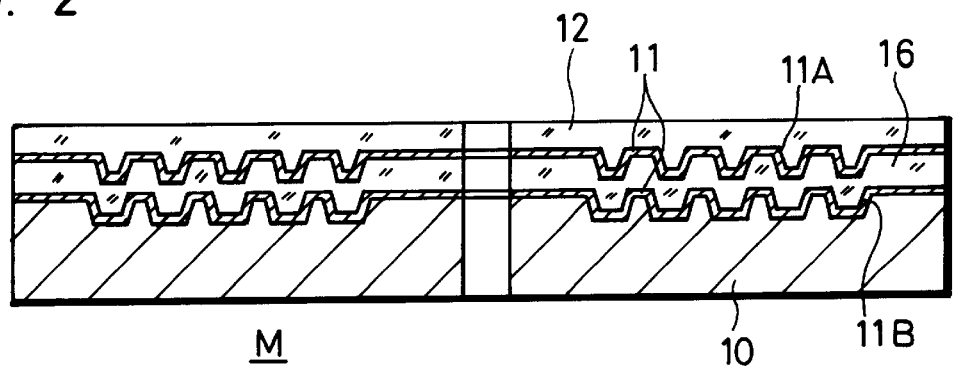
FIG. 2 is a schematic cross-sectional view showing a second example of the optical recording medium according to the present invention.

A second embodiment of the optical recording medium according to the present invention will be described with reference to FIG. 2 which is a schematic cross-sectional view thereof. As shown in FIG. 2, in the second embodiment, the information recording surface thereof has such an arrangement that a first information recording surface 11A and a second information recording surface 11B, each being more than at least one recording surface, are laminated via an intermediate layer 16 serving as a light transmission layer.

In this arrangement, the sum of the thicknesses of the light transmission layer and the intermediate layer interposed between the surfaces to which the laser light is incident from the respective information recording surfaces is set to be 3 $\mu$m to 182 $\mu$m. For example, in the arrangement shown in FIG. 2, the sum of the thicknesses of light transmission layer 12 and intermediate layer 16 is set as 3 $\mu$m to 182 $\mu$m. Also, in this case, the thickness irregularity from the surface to which the laser light is incident to the information recording surface is set within $\pm 5.26 \, \lambda/(N.A.)^4$.

With respect to the first information recording surface 11A, similar to the arrangement described in connection with FIG. 1, the track pitch TP of its information recording surface is set to be 0.27 $\mu$m to 0.404 $\mu$m, the minimum pit length $P_{min}$ of the information recording pit is set to be 0.13 $\mu$m to 0.215 $\mu$m, the recording line density LD is set to be a pit string equal to or less than 0.146 $\mu$m/bit, and the depth D of information recording pit is set 31 nm to 75 nm.

On the other hand, as to the second information recording surface 11B, its track pitch TP is set to be 0.45 $\mu$m to 0.57 $\mu$m, the minimum pit length $P_{min}$ of information recording pit is set to be 0.21 $\mu$m to 0.31 $\mu$m, and the recording line density LD is set to be a pit string equal to or less than 0,21 $\mu$m/bit. Further, the depth D of information recording pit is set to be 57 nm to 113 nm.

The laser light with the wavelength $\lambda$ of 380 nm$\leq\lambda\leq$450 nm is irradiated on the first information recording surface 11A through the lens system having the N.A. equal to or more than 0.76, while the laser light with the wavelength $\lambda$ 635 nm$\leq\lambda\leq$680 nm is irradiated on the second information recording surface 11B via the lens system having the N.A. equal to or more than 0.76, respectively, whereby at least any of recording or reproduction of each of them is carried out.

The arrangement of the optical recording medium according to the present invention will be described further.

First, the second information recording surface 11B whose reproduction or/and recording are performed by a laser light of a red wavelength range will be described.

In a DVD (Digital Versatile Disc or Digital Video Disc) already proposed, an area of an information signal portion is in an range from 24 mm to 58 mm in radius from the disc center, the optical system with the wavelength of 0.65 nm and the N.A. of 0.6 is used, and the memorizing capacity thereof is 4.7 GB. Accordingly, in order to realize the memorizing capacity of 8 GB based on this memorizing capacity, because the capacity (in this case, density) is in proportion to the N.A., in reverse proportion to the wavelength and is effected by its square, the following equation (1) should be established:

$$8/4.7 = \{(N.A./0.6) \times (0.65/\lambda)\}^2 \qquad (1)$$

As a laser light with a red wavelength range, there are laser lights of wavelength $\lambda$ of 635 nm$\leq\lambda\leq\leq$680 nm or practically 0.635 $\mu$m, 0.650 $\mu$m, 0.680 $\mu$m and so on. However, in order to increase the recording density, among these laser lights, the laser light having the short wavelength of $\lambda=0.635$ $\mu$m may be good. When $\lambda=0.635$ $\mu$m is used in the above equation (1), $$8/4.7=\{(N.A./0.6)\times(0.65/0.635)\}^2 \quad (1_1)$$

so that N.A.=0.76 is obtained.

In order to achieve the recording capacity of 8 GB by using λ=0.635 μm and N.A.=0.76, the track pitch TP, the minimum pit length $P_{min}$ and the line density LD become as follows:

$$TP=0.74/\sqrt{(8.47)}=0/57 \text{ μm}$$

$$P_{min}=0.40/\sqrt{(8/4.7)}=0.31 \text{ μm}$$

$$LD=0.267/\sqrt{(8/4.7)}=0.21 \text{ μm/bit}$$

Here, in the DVD of 4.7 GB, the track pitch is 0.74 μm, the minimum pit length is 0.40 μm and the line density is 0.267 μm/bit, and also the modulation system is an EFM.

Then, as will be described later on, when the lens system is comprised of a 2-group lens, from the relation of equation $(1_1)$, the above values become as follows:

$$TP=0.74/(0.95/0.6\times0.65/0.635)=0.45 \text{ μm}$$

$$P_{min}=0.4/(0.95/0.6\times0.65/0.635)=0.24 \text{ μm}$$

$$LD=0.267/(0.95/0.6\times0.65/0.635)=0.16 \text{ μm/bit}$$

Thus, in the present invention, the track pitch TP is set to be 0.45 μm to 0.57 μm, the minimum pit length is set to be 0.24 μm to 0.31 μm, and the recording line density LD is set to be a pit string equal to or less than 0.21 μm/bit.

Here, for the optical disc modulation system, there are modulation system of the EFM (2-7) system and the (1-7) system, and the ratios between the minimum pit lengthes, the channel pit lengthes and the signal pit lengthes of the respective systems are 3:1:2 in the EFM system and 4:2:3 in the 1-7 system, respectively. From the relation, in the case of the same density, if the 1-7 system is used, the pit length is decreased to 8/9. If this is multiplied, the minimum pit length becomes 0.12 μm.

On the other hand, the depth D of pit becomes the maximum modulation degree with ¼ of the wavelength λ when it is deepest. When it is shallow, the push-pull signal in a push-pull system which is well known as one of the tracking error servo system with λ/8 becomes maximum. Therefore, the depth D of pit is required to be in the above range. Therefore, the depth D of pits for the longer wavelength of 680 nm and the shorter wavelength of 635 nm of the red laser light respectively become as follows:

680/4/1.5=113 nm

635/8/1.5=57 nm

That is, in the present invention, the depth D of pit is set to be 57 nm to 113 nm.

Meanwhile, when the recording and/or reproduction is performed on the information recording surface 11A, a laser light of the short wavelength as compared with the red laser light, namely 430 nm shorter than blue or equal to or less than 450 nm obtained by, for example, a SHG (secondary harmonic generation), 400 nm of a semiconductor laser, or further a laser light of 380 nm is used. In this case, the following values are obtained.

$$TP=0.74\times(0.45/0.65\times0.6/0.76)=0.404 \text{ μm}$$

$$P_{min}=0.40\times(0.45/0.65\times0.6/0.76)=0.219 \text{ μm}$$

$$LD=0.267\times(0.45/0.65\times0.6/0.76)=0.146 \text{ μm/bit}$$

Then, as will described later on, when the lens system is comprised of a 2-group lens, about N.A.=0.95 can be realized. Therefore, the above values becomes as follows;

$$TP=0.74\times(0.38/0.65\times0.6/0.95)=0.27 \text{ μm}$$

$$P_{min}=0.40\times(0.38/0.65\times0.6/0.95)=0.14 \text{ μm}$$

$$LD=0.267\times(0.38/0.65\times0.6/0.95)=0.09 \text{ μm/bit}$$

Hence, with respect to the information recording surface 11A, the track pitch TP is set to be 0.27 μm to 0.404 μm, the minimum pit length is set to be 0.14 μm to 0.219 μm, and the recording line density is set to be a pit string equal to or less than 0.146 μm/bit.

Since the minimum pit length becomes 8/9 in the 1-7 system similar to that mentioned before, it becomes 0.13 μm.

The tolerance degree (skew margin) SM of the inclination of optical recording medium relative to the optical axis of irradiating laser light has the following relation $$SM \propto \lambda/(N.A.)^3/t$$

so that upon increasing the N.A., the thickness t of the light transmission layer 12 through which the laser light is directed to the information recording surface 11A passes should be made small.

As to the skew margin SM, it is known from the Japanese Patent Opening No. Hei 3-225650 that it is sufficient that the SM satisfied the following relation $$|SM| \leq 84.115°(\lambda/(N.A.)^3/t)$$

The above relation can be applied to the optical recording medium of the present invention, and as the practical critical value of SM, it is reasonable to set the SM to be 0.4°.

It is now discussed how the thickness of the light transmission layer should be set by making the wavelength of laser light shorter and the N.A. higher with the SM=0.4°. When the interchangability of the laser light with a shorter wavelength blue-purple laser light of λ=0.38 μm is further taken into consideration, if such a condition such the N.A. is equal to or more than 0.76 mentioned above is not changed, the thickness t of light transmission layer becomes t=182 μm.

On the other hand, the lower limit of the thickness of light transmission layer is decided whether the protective function of the light transmission layer having a role to protect the recording film and the reflection film is secured. That is, if the reliability of optical recording medium and the influence by the collision of the surface of light transmission layer with a lens when it approaches the light transmission layer due to the high/N.A. of the 2-group lens described later are taken into consideration, the above lower limit is required to be equal to or more than 3 μm.

Thus, in the present invention, the thickness t of light transmission layer is set to be 3 μm to 183 μm.

Also, the high accuracy is required for the thickness of light transmission layer.

When the thickness of light transmission layer is deviated from the design center of a reproduction objective lens, an aberration amount of laser spot which is caused by the thickness irregularity is in proportion to the fourth power of N.A. and the wavelength λ.

Accordingly, when the high recording density is intended by making the N.A. high and the wavelength short, the thickness irregularity of light transmission layer is severely restricted further.

In the case of a CD as a practical system example, N.A.=0.45 is used in practice, and the standard of the thickness irregularity of light transmission layer (substrate in the CD) is ±100 μm.

Also, in the case of the DVD, the similar thickness irregularity is standardized as ±30 μm with N.A.=0.6.

When the tolerance amount of ±100 μm in the CD is taken as a reference, the thickness irregularity Δt becomes as follows:

$$\Delta t = \pm (0.45/N.A.)^4 \times (\lambda/0.78) \times 100 = \pm 5.26 \times (\lambda/(N.A.)^4 \, \mu m$$

When the large capacity is intended in the above-mentioned optical recording medium, in order to obtain a skew margin SM similar to the SM in the DVD, the thickness t of light transmission layer for N.A.=0.85 is required to be equal to or less than $$0.6 \times (0.6/0.85)^3 = 0.21 \text{ mm}$$

Further, when the interchangability with the blue-purple laser with the wavelength of about 400 nm is considered, $$0.21 \times 0.4/0.65 = 0.129 \text{ mm}$$

is obtained, whereby the thickness t of light transmission layer is set to be equal to or less than 0.12 mm.

When the light transmission layer 12 is practically formed, it is concided, for example, to coat a resin or to bond a resin sheet. In the resin coating process, there is caused such a problem that a skew is generated by the shrinkage of resin when it is cured or an upheaval is produced on the outermost portion by the resin being coated while rotated.

Figure 3:
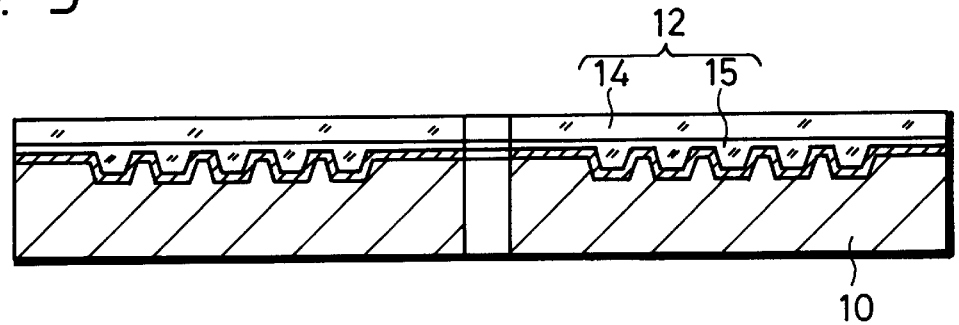
FIG. 3 is a schematic cross-sectional view showing a third example of the optical recording medium according to the present invention.

Therefore, as in a third embodiment of the optical recording medium according to the present invention whose schematic cross-section is shown in FIG. 3, it may be considered an effective method that a transparent resin sheet 14 is bonded by a transparent adhesive layer 15. In this case, when the resin sheet becomes thinner than 50 μm, the double refractive index becomes large and the signal characteristic is affected. Therefore, the thickness t of light transmission layer is desired to be equal to or more than 50 μm.

In addition, in view of influence on the recording and/or reproducing laser spot due to adhesion of dust to the light transmission layer or generation of a flaw thereon and the servo unstability thereby, the thickness t of light transmission layer is also preferred to be equal to or more than 50 μm.

From the above description, it is preferred more that the thickness t of light transmission layer is set to be 50 μm to 120 μm.

Figure 4A:
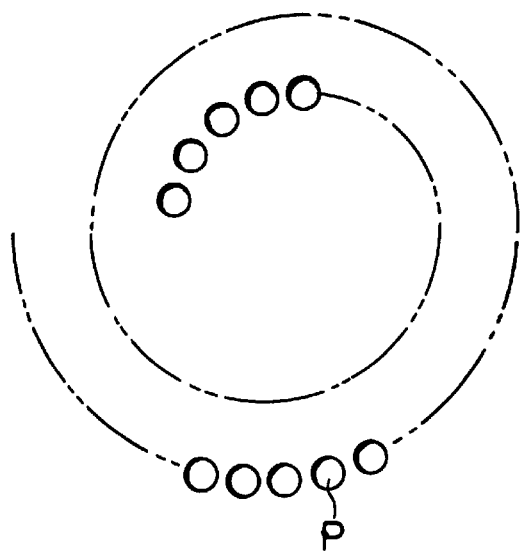
FIGS. 4A and 4B are respectively pattern diagrams of pit strings of the examples of the optical recording medium according to the present invention.
Figure 4B:
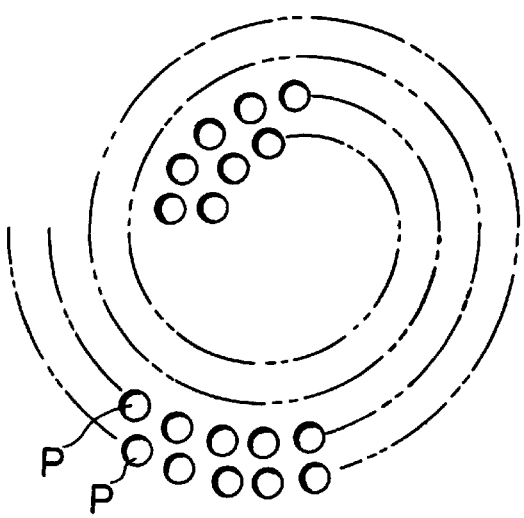

The structure of optical recording medium according to the present invention will be described. The string of pits P on the optical recording medium of the present invention may be formed on a single or one spiral line as shown in FIG. 4A or on a plurality or two spiral lines as shown in FIG. 4B.

Figure 5:
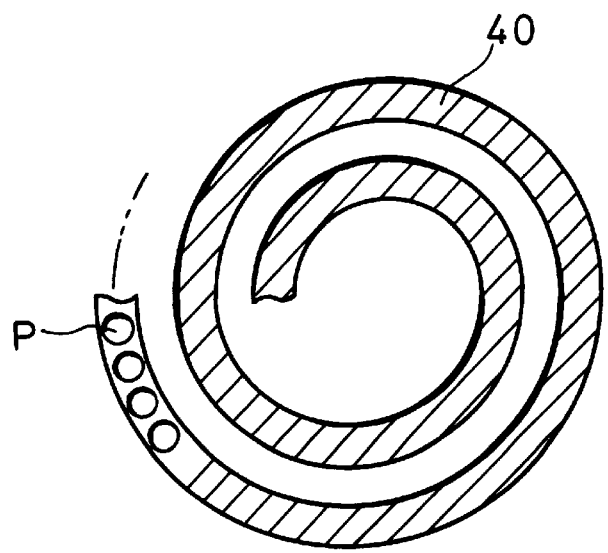
FIG. 5 is a pattern diagram of a pit string of the example of the optical recording medium according to the present invention.

Further, as shown in FIG. 5 which illustrates a schematic pattern thereof, a recordable area 40 shown by hatchings may be formed on the areas of the information recording surface 11A and information recording surface 11B other than the forming area of information pits P.

Similar to the pit string mentioned above, the recordable area 40 may be a single spiral or plural spirals.

When plural, for example, double spirals (two parallel spirals) or the like are formed, such an arrangement may be possible in which a spiral-shaped groove is formed, a recordable area is formed within the groove and on a so-called land between the adjacent grooves, and a pit P forming a ROM unit is formed on, for example, the land.

Figure 6A:
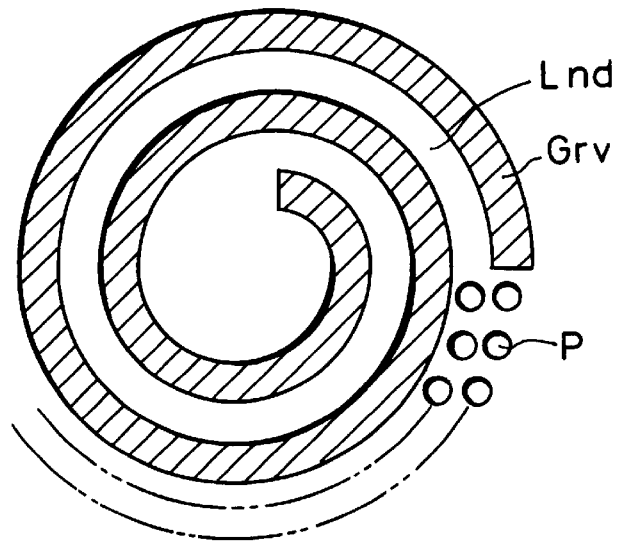
FIGS. 6A to 6C are information pattern diagrams of the examples of the optical recording medium according to the present invention, respectively.
Figure 6B:
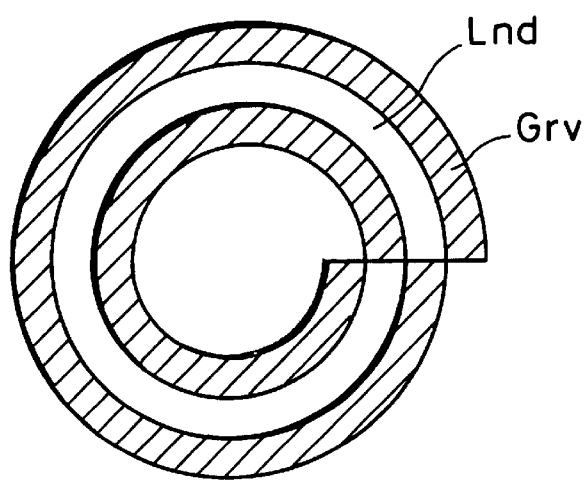
Figure 6C:
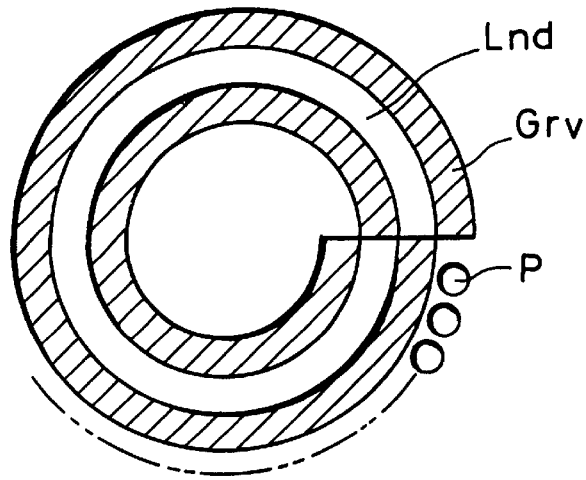

Further, as shown in FIG. 6A of a schematic pattern, a spiral-shaped groove Grv marked with hatching is formed, and a pit string is formed on each of extension lines of groove Grv and a land Lnd between the grooves Grv, and as shown in FIGS. 6B and 6C, the groove Grv and the land Lnd are formed alternatively in which a string of pits P is formed on the extension line of each of the groove Grv and the land Lnd.

As described above, when the first information recording surface 11A and the second information recording surface 11B, which are different in arrangement, are laminated, they can be laminated via an intermediate layer 16 made of, for example, an ultraviolet curing resin.

In this case, the thickness t of the light transmission layer relative to the second information recording surface 11B is the sum of thickness of the intermediate layer 16 and the light transmission layer 12 on the surface described before.

In this case, it is preferred that the information recording surface 11A made to correspond to the shorter wavelength is located on the side close to the laser light incident side as compared with the second information recording surface 11B or on the side close to the objective lens of the optical recording and reproducing apparatus because the skew margin becomes more severe as the wavelength is made shorter.

In each of the above arrangements, on the information recording surface 11A of ROM arrangement by the pit string, there is formed a reflection film. When a multi-layer structure in which the information recording surface is laminated in plural is made, the reflection layer on the laser light incident side is made semitransparent.

In the recordable area, a rewritable or write once or so-called WO type and so on can be arranged. When a so-called phase change type is arranged, a phase change material layer is formed. If necessary, even in the recordable area a reflection film may be formed on its forming surface, namely on the groove and land surfaces, for example.

In each of the above examples, it is possible to make, for example, the information recording surface 11A to be a multi-layer structure, or the first information recording surface 11A and the second information recording surface 11B are made an a multi-layer structure, respectively. That is, the present invention is not limited to the examples shown in the drawings.

Figure 7:
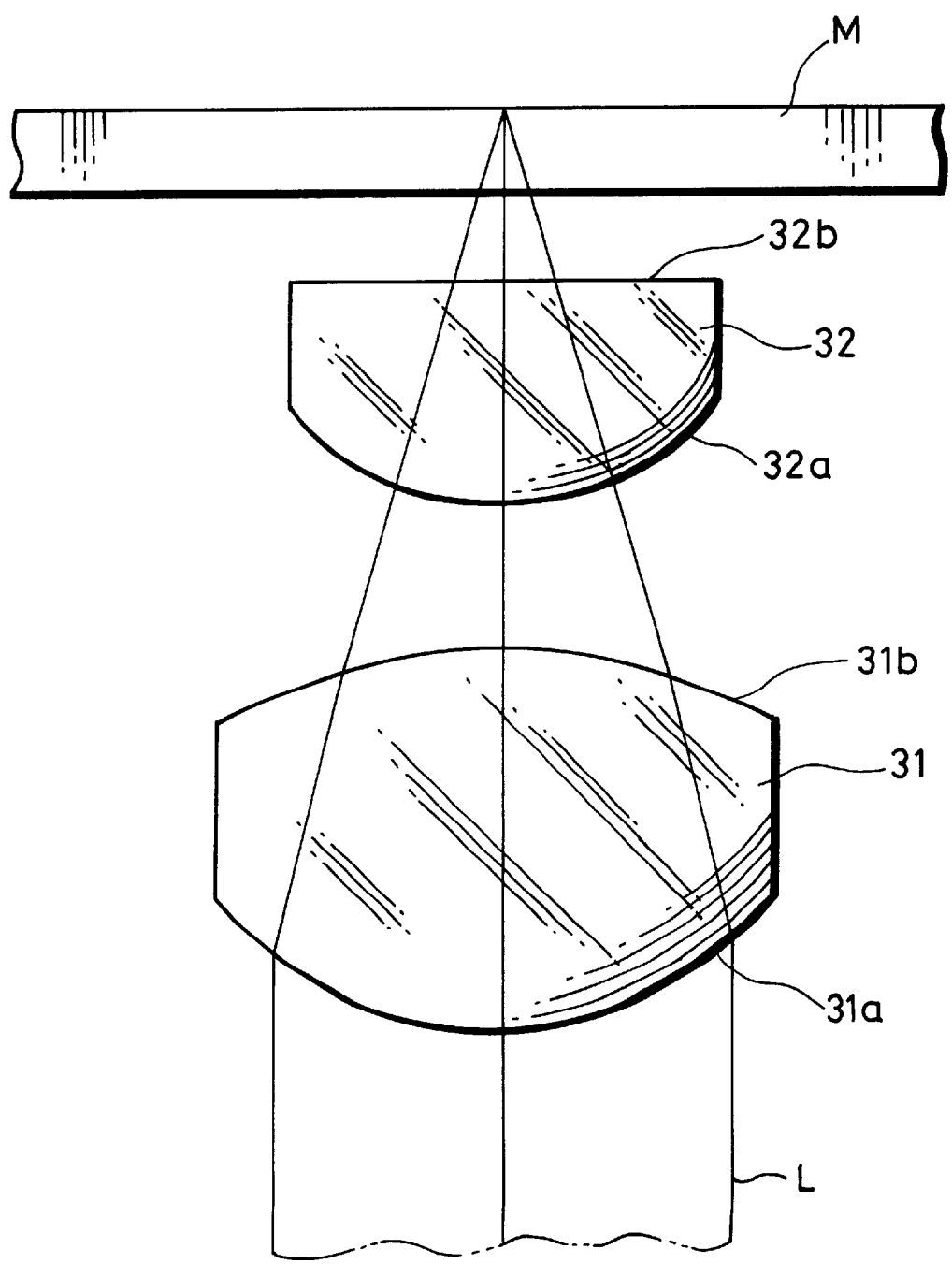
FIG. 7 is a diagram showing a main part of an example of an optical recording and reproducing apparatus according to the present invention.

Also, the optical recording and reproducing apparatus according to the present invention uses each optical recording medium M having the information recording surface 11A or first and second information recording surfaces 11A and 11B, for example, the optical disc and performs the reproduction or/and recording for the optical recording medium. FIG. 7 is a schematic diagram showing the main part of an example of the optical recording and reproducing apparatus.

For example, the optical recording and reproducing apparatus for the optical recording medium having only the information recording surface 11A includes a laser light source unit (not shown) generating a laser light L with the wavelength λ in a range of 380 nm ≤ λ ≤ 450 nm. The laser light L is made incident through an optical system having the N.A. (numerical aperture) equal to or more than 0.76, namely an objective lens to, for example, an optical recording medium M to be rotated in the direction perpendicular thereto from the light transmission layer 12 side to thereby carry out the reproduction or/and recording of a recording information from and on the information recording surface.

The optical recording and reproducing apparatus performing the reproduction or/and recording for the optical recording medium having the second information recording surface, to which the laser light with the wavelength λ of 635 nm ≤ λ ≤ 680 nm mentioned above is used, includes, an shown in FIG. 7, a laser light source unit (not shown) for producing a laser light with the wavelength λ of 380 nm ≤ λ ≤ 450 nm described above as a first light source unit and also a light source unit (not shown) for the laser light L of 635 nm≦680 nm as a second light source unit. In this case, both the laser lights are switched and irradiated on the optical recording medium M whether the reproduction or/and recording are carried out for any information recording surface of the first information recording surface 11A and the second information recording surface 11B.

The optical system for each optical recording and reproducing apparatus mentioned above may be comprised of 2-group lens systems 31 and 32, which leads to obtain a high N.A. These lens systems 31 and 32 are not only comprised of single lesses having predetermined curved surfaces 31a, 31b and 32a, 32b, respectively, but also comprised of lens groups, each being formed of a plurality of lenses, respectively.

The 2-group lens systems 31 and 32 of the optical system may be arranged such that the interval therebetween is adjustably varied. By this variable arrangement, it is possible to cancel a wave aberration caused by the changing of the thickness of light transmission layer. Thus, it is possible to simplify the design and manufacture of optical recording medium and optical recording and reproducing apparatus, stabilize the recording and reproduction and improve the characteristics.

As described above, according to the present invention, while the skew margin is being kept to be a value similar to that of DVD, it is possible to produce an optical recording medium which can present a large recording capacity of, for example, 8 GB and an optical recording and reproducing apparatus which performs the reproduction or/and recording for the optical recording medium.

While in the above-described optical recording medium one or more layers of information recording surface are formed on one surface of substrate 10, it is possible to produce a double-sided optical recording medium by such a manner that two substrates 10 each having the information recording surface are bonded each other on sides opposite to the sides where the information recording surface is formed. In correspondence therewith, the optical recording and reproducing apparatus for this optical recording medium is arranged to irradiate laser lights on the information recording surfaces on both the surfaces, respectively. In other words, the optical recording medium and the optical recording and reproducing apparatus according to the present invention can be changed and modified variously.

By the way, in this specification the words "transparent" and "light transmission" of course indicate the permeability for the laser lights used.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical recording medium having a signal recording area in which a light transmission layer is formed on an information recording surface having formed an information recording pit, a laser light with a wavelength λ of 380 nm≦λ≦450 nm is irradiated from said light transmission layer side through a lens system having a N.A. (numerical aperture) equal to or more than 0.76 to read said information, wherein in the signal recording area, a thickness of said light transmission layer is set to be 3 μm to 182 μm, a thickness irregularity of said light transmission layer is set to be within ±5.26 λ/(N.A.)$^4$, a track pitch of said information recording surface is set to be 0.27 μm to 0.404 μm, a minimum pit length of said information recording pit is set to be 0.13 μm to 0.219 μm, a recording line density is set to be a pit string equal to or less than 0.146 μm/bit, and a depth of said information recording pit is set to be 31 nm to 75 nm.

2. An optical recording medium as claimed in claim 1, wherein said pit string is formed of a single or a plurality of spirals.

3. An optical recording medium as claimed in claim 1, wherein the thickness of said light transmission layer is set to be 50 μm to 120 μm.

4. An optical recording medium as claimed in claim 1, wherein said information recording surface is laminated more than two layers.

5. An optical recording medium as claimed in claim 1, wherein a recordable area is provided in an area other than an area for forming said information pit of said information recording surface.

6. An optical recording medium as claimed in claim 5, wherein said recordable area is formed of a single or plurality of spirals.

7. An optical recording medium as claimed in claim 1, wherein an information recording surface having said information recording pit and an information recording surface having a recordable area are laminated.

8. An optical recording medium as claimed in claim 7, wherein said information recording surface having said pit string is disposed on a laser light incident side than said information recording surface having said recordable area.

9. An optical recording and reproducing apparatus using an optical recording medium in which a light transmission layer is formed on an information recording surface having formed an information recording pit, a thickness of said light transmission layer is set to be 3 μm to 182 μm, a thickness irregularity of said light transmission layer is set to be within ±5.26λ/(N.A.)$^4$, a track pitch of said information recording surface is set to be 0.27 μm to 0.404 μm, a minimum pit length of said information recording pit is set to be 0.13 μm to 0.219 μm, a recording line density is set to be a pit string equal to or less than 0.146 μm/bit, and a depth of said information recording pit is set to be 31 nm to 75 nm, wherein a laser light with a wavelength λ of 380 nm≦λ≦450 nm is made incident on said optical recording medium from said light transmission layer side through an optical system having a N.A. (numerical aperture) equal to or more than 0.76 to reproduce a recorded information on said information recording surface.

10. An optical recording and reproducing apparatus using an optical recording medium in which a light transmission layer is formed on an information recording surface having formed an information recording pit and a recordable area, a thickness of said light transmission layer is set to be 3 μm to 182 μm, a thickness irregularity of said light transmission layer is set to be within ±5.26 λ/(N.A.)$^4$, a track pitch of said information recording surface is set to be 0.27 μm to 0.404 μm, a minimum pit length of said information recording pit is set to be 0.13 μm to 0.219 μm, a recording line density is set to be a pit string equal to or less than 0.146 μm/bit, and a depth of said information recording pit is set to be 31 nm to 75 nm, wherein a laser light with a wavelength λ of 380 nm≦λ≦450 nm is made incident on said optical recording medium from said light transmission layer side through an optical system having a N.A. (numerical aperture) equal to or more than 0.76 to perform at least any of a reproduction or recording of a recording information on said information recording surface.

11. An optical recording and reproducing apparatus in which a light transmission layer is formed on an information recording surface, a laser light is irradiated from said light transmission layer side, said information recording surface is formed by laminating a first information recording surface and a second information recording surface, each having at least more than one, through an intermediate layer made of a light transmission layer, a sum of thicknesses of a light transmission layer and an intermediate layer interposed between said each information recording surface and an incident surface of said laser light is set to be 3 µm to 182 µm, a thickness irregularity between an incident surface and all of information recording surfaces is set to be within ±5.26 $\lambda/(N.A.)^4$, a track pitch of said first information recording surface is set to be 0.27 µm to 0.404 µm, a track pitch of said second information recording surface is set to be 0.45 µm to 0.57 µm, a laser light with a wavelength $\lambda$ of 380 nm$\leq\lambda\leq$450 nm is irradiated on said first information recording surface through an optical system having a N.A. (numerical aperture) equal to or more than 0.76, a laser light with a wavelength $\lambda$ of 635 nm$\leq\lambda\leq$680 nm is irradiated on said second information recording surface through an optical system having a N.A. (numerical aperture) equal to or more than 0.76 to thereby perform at least any of a recording or a reproduction, respectively.

12. An optical recording and reproducing medium as claimed in claim 11, wherein said first information recording surface has an information recording pit, a minimum pit length of said information recording pit is set to be 0.13 µm to 0.219 µm, its line recording density is set to be a pit string equal to or less than 0,146 µm/bit, a depth of said information recording pit is set to be 31 nm to 75 nm, said second information recording surface has an information recording pit, a minimum pit length of said information recording pit is set to be 0,21 µm to 0.31 µm, its line recording density is set to be a pit string equal —to or less than 0,21 µm/bit, and a depth of said information recording pit is set to be 57 nm to 113 nm.

13. An optical recording and reproducing medium as claimed in claim 11, wherein said first information recording surface is disposed on a laser light incident side than said second information recording surface.

14. An optical recording and reproducing medium as claimed in claim 12, wherein said first information recording surface is disposed on the laser light incident side than said second information recording surface.

15. An optical recording and reproducing apparatus using an optical recording medium in which a light transmission layer is formed on an information recording surface, a laser light is irradiated from said light transmission layer side, said information recording surface is formed by laminating a first information recording surface and a second information recording surface, each having at least more than one, through an intermediate layer made of a light transmission layer, a sum of thicknesses of a light transmission layer and an intermediate layer interposed between said each information recording surface and an incident surface of said laser light is set to be 3 µm to 182 µm, a thickness irregularity between an incident surface and all of information recording surfaces is set to be within +5.26 $\lambda/\mu m(N.A.)^4$, a track pitch of said first information recording surface is set to be 0.27 µm to 0.404 µm, a track pitch of said second information recording surface is set to be 0,45 µm to 0.57 µm, a first laser light with a wavelength $\lambda$ of 380 nm $\lambda\leq$450 nm and a second laser light with a wavelength $\lambda$ of 635 nm$\leq\lambda\leq$680 nm are respectively irradiated on said first information recording surface and said second information recording surface through an optical system having a N.A. (numerical aperture) equal to or more than 0.76 to thereby perform at least any of a recording or a reproduction, respectively.

16. An optical recording and reproducing apparatus as claimed in claim 15, wherein there is used an optical recording medium in which said first information recording surface has an information recording pit, a minimum pit length of said information recording pit is set to be 0.13 µm to 0.219 µm, its line recording density is set to be a pit string equal to or less than 0.146 µm/bit, a depth of said information recording pit is set to be 31 nm to 75 nm, said second information recording surface has an information recording pit, an minimum pit length of said information recording pit is set to be 0.21 µm to 0.31 µm, its line recording density is set to be a pit string equal to or less than 0.21 µm/bit, and a depth of said information recording pit is set to be 57 nm to 113 nm.

17. An optical recording and reproducing apparatus as claimed in claim 9, wherein said optical system is comprised of a 2-group lens system.

18. An optical recording and reproducing apparatus as claimed in claim 10, wherein said optical system is comprised of a 2-group lens system.

19. An optical recording and reproducing apparatus as claimed in claim 15, wherein said optical system is comprised of a 2-group lens system.

20. An optical recording and reproducing apparatus as claimed in claim 17, wherein an interval between lenses of 2-group lens of said optical system is made variable.

21. An optical recording and reproducing apparatus as claimed in claim 18, wherein an interval between lenses of 2-group lens of said optical system is made variable.

22. An optical recording and reproducing apparatus as claimed in claim 19, wherein an interval between lenses of 2-group lens of said optical system is made variable.

23. An optical recording medium having a signal recording area in which a light transmission layer is formed on an information recording surface having formed an information recording pit, a laser light with a wavelength λ of 635 nm≦λ≦680 nm is irradiated from said light transmission layer side through a lens system having a N.A. (numerical aperture) equal to or more than 0.76 to read said information, wherein in the signal recording area, a thickness of said light transmission layer is set to be 3 μm to 182 μm, a thickness irregularity of said light transmission layer is set to be within ±5.26 λ/μm(N.A.)$^4$, a track pitch of said information recording surface is set to be 0.45 μm to 0.57 μm, a minimum pit length of said information recording pit is set to be 0.21 μm to 0.31 μm, a recording line density is set to be a pit string equal to or less than 0.21 μm/bit, and a depth of said information recording pit is set to be 57 nm to 113 nm.

* * * * *